United States Patent [19]

Fourre et al.

[11] Patent Number: 4,460,996
[45] Date of Patent: Jul. 17, 1984

[54] PROCESS AND APPARATUS FOR ERROR DETECTION

[75] Inventors: Rémy D. Fourre, Les Ulis; Bruno de Langre, Paris, both of France

[73] Assignee: Societe d'Etudes et Conseills A E R O(Automation-Electronique-Recherche/Operationnelle, France

[21] Appl. No.: 304,915

[22] Filed: Sep. 23, 1981

[30] Foreign Application Priority Data

Oct. 15, 1980 [FR] France .................................. 80 22040

[51] Int. Cl.³ .............................................. G06F 11/00
[52] U.S. Cl. ........................................... 371/6; 371/57
[58] Field of Search ................... 371/52, 57, 71, 6, 30, 371/7; 324/73 R; 307/442, 443; 340/651, 650

[56] References Cited

U.S. PATENT DOCUMENTS

| | | | |
|---|---|---|---|
| 3,548,175 | 12/1970 | Tomlin | 371/71 |
| 3,581,075 | 6/1971 | Mattsson | 371/71 |
| 3,586,968 | 6/1971 | Barjot | 371/22 |
| 3,716,834 | 2/1973 | Adams | 371/71 |
| 4,320,512 | 3/1982 | Richman | 371/52 |

*Primary Examiner*—Charles E. Atkinson
*Attorney, Agent, or Firm*—Roylance, Abrams, Berdo & Goodman

[57] ABSTRACT

A process for the prevention of the propagation of errors in a security processor having processing circuits which carry out arithmetic and logic operations on given operands, and detection devices for detecting single definite breakdowns occurring in these processing circuits in which single ambiguous breakdowns resulting in the weakening of a signal are detected by the detection of the single definite breakdowns, by using signal interpreting circuits which make the weakened signals definite, whether or not correct. In addition, definite or ambiguous breakdowns of these interpreting circuits are also detected by the detection devices.

7 Claims, 6 Drawing Figures

PROCESS AND APPARATUS FOR ERROR DETECTION

The present invention relates to a process and a device for the prevention of the propagation of errors in a processor of the type known as a security processor, i.e., one which has internal means for breakdown detection. In particular, the invention relates to techniques for making it possible to easily detect multiple errors which arise from breakdowns which result from the weakening of a logic signal which is utilized simultaneously by several components.

BACKGROUND OF THE INVENTION

Security processors are used particularly in transportation systems, particularly in the field of aviation.

In order to permit a better understanding of the following discussion of the prior art and of the present invention, certain terms which will be used will first be defined as follows.

"Breakdown" or "breakdown state" is used to describe a definitive modification of a component, i.e., an arithmetic and logic processing circuit which prevents it from carrying out its normal function.

"Error" means an abnormal state at a point of the processor manifesting the breakdown of a component. It will be understood that a breakdown does not necessarily cause an error if the component is not completely utilized. This breakdown remains "latent" and is not detected. It will also be recognized that an error can be due to momentary interference and not to a breakdown as defined above. However, this latter possibility is not considered in the present context.

"Signal" means a bit or vector of bits in parallel form transmitted between components.

"Single breakdown" means a breakdown which affects only one component of the processor, all of the others retaining their normal functions.

"Multiple breakdown" means the state of the processor which occurs when several components are simultaneously in breakdown states whether or not these breakdowns have a common cause.

"Definite breakdown" is a breakdown of a component which produces an erroneous signal of a type which can be interpreted in only one binary fashion, i.e., the erroneous bit or signal can be interpreted only as a "1" or a "0".

"Ambiguous breakdown" means a breakdown of a component which is of a type such that a weakened signal is produced such that certain bits of the signal can be interpreted either as a "1" or a "0", depending upon the threshold of the component receiving the signal.

"Upstream" and "Downstream" refer to the relative positions of components in a signal flow relationship. A component B is "downstream" of a component A if the component B receives a signal from component A. Component A is then "upstream" from component B.

Security processors, according to previously known and existing techniques, can be equipped with means for breakdown detection. These means often operate by coding the states of parallel binary lines with such codes as a Berger code or k out of n code, or a parity code such as described in numerous U.S. patents and in an article entitled "The Design of Self-Checking Multi-Output Combinational Circuits," Ko and Breuer (Proceedings of the National Computer Conference, Dallas, 1977, AFIPS Joint Computer Conference).

These signals are then monitored by test means which are decoders which generate an error alarm whenever their inputs do not find that the appropriate code exists. As an example, a parity detector such as an SN54 LS280 could be used to test a parity code.

However, most codes and decoders cannot systematically detect errors which involve more than one binary line. An example is the undetectability of any even number of errors by a parity code and associated decoder. This is why, in the techniques heretofore existing, the only breakdowns that can be detected with certainty are "single", "definite" breakdowns because a single definite breakdown generates only one erroneous signal which can be interpreted in only one way, leading to a known logic state of the processor and thereby making it possible to analyze by the corresponding codes and detection tests.

However, the components used in processors are susceptible to types of breakdowns which involve signal weakening, these breakdowns having been referred to as dubious, fuzzy or ambiguous breakdowns because the weakened signal may or may not be correctly interpreted depending upon the nature and threshold of the receiving components. In other words, a signal having an ambiguous error which is concurrently delivered to two components might be interpreted in one way by one of the components and in a different way by the other component. The drawback of the existing technique thus is that a single ambiguous breakdown of a component whose signal is delivered to several downstream components can generate multiple interpretations and simultaneous multiple errors, exceeding the detection capacity of the code and test means.

Such a situation has the same effect as simultaneous multiple definite breakdowns which can generally not be dealt with by existing techniques.

BRIEF SUMMARY OF THE INVENTION

Accordingly, it is a primary object of the present invention to provide a method for detecting a single ambiguous breakdown which would otherwise simultaneously generate several errors which would exceed the detection capacity of existing code and test means.

It should be emphasized that the invention does not involve or require specific coding or decoding techniques.

Briefly described, the invention includes a process for preventing the propagation of errors in a security processor of the type having a plurality of processing circuits for carrying out arithmetic and logic operations on given operands and in which the circuits are subject to ambiguous breakdowns producing ambiguous, weakened signals and wherein downstream circuits are responsive to the same weakened signals in an unpredictable manner, the processor having detection means for detecting definite single breakdowns, including providing a plurality of signal interpreting circuits, one at each of a plurality of locations in the processor in which signals are delivered in parallel from an upstream component to a plurality of downstream components, altering each ambiguous signal with a signal interpreting circuit to be a definite signal, and detecting the existence of any erroneously altered signal with the detection means.

In another aspect, the invention comprises a device for the prevention of the propagation of errors in a security processor of the type having processing circuits for performing arithmetic and logic operations on given operands and means for detecting single definite breakdown errors occurring as the result of breakdowns in the processor, and having an arrangement of components in which a single upstream component produces signals which are distributed to a plurality of downstream components, the device including a plurality of signal interpreting circuit means, each for receiving an ambiguous, weakened signal and producing a signal having a definite, unambiguous output, circuit means for interconnecting said signal interpreting circuit means in series relationship with each other with the input to each of said downstream components being connected between two successive interpreting circuit means, said means for detecting being connected to detect a single definite breakdown in said downstream components and an incorrect output from the last of the series of interpreting circuit means.

As will be recognized, the heart of this technique is an intermediate component referred to as a rectifier or a signal correction or interpreting circuit, the term "rectifier" being used in this context to mean a circuit for putting something right rather than a circuit for converting AC to DC. The function of the circuit is to receive a weakened signal and put that signal back into a form so that it will have only one and the same interpretation, unambiguously, for all downstream components which receive that signal. That is, transforming an intermediate input voltage into a definite "0" or "1" level output, and transmitting, without modification, definite "0" or "1" inputs. Because the signal correction circuit itself is susceptible to ambiguous breakdown, several such circuits are actually employed, arranged in such a way that a testing means using existing techniques makes it possible to detect a single ambiguous breakdown which affects one of the single correction circuits as will be more clearly described hereinafter.

Several forms of implementation of the invention are described hereinafter as examples with reference to the accompanying drawings wherein.

Figure 1:
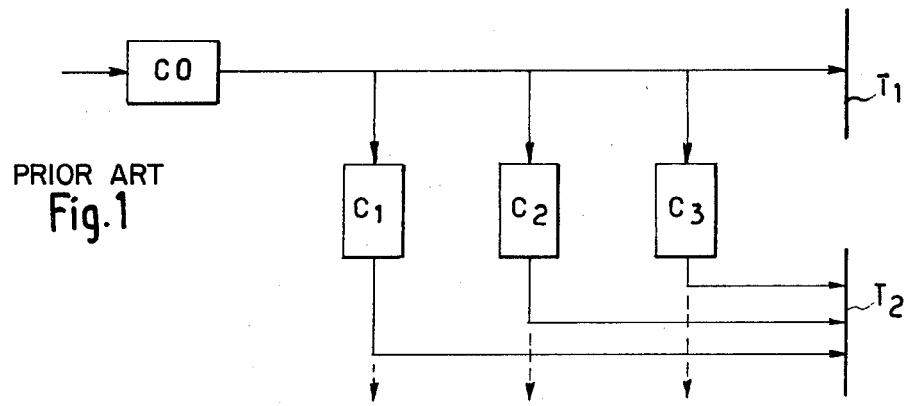
FIG. 1 is a schematic circuit diagram in block form showing a basic arrangement of components in a security processor in accordance with the prior art.

FIG. 1 is included to illustrate the principles of the existing technology in connection with processors known as security processors. When several components such as $C_1$, $C_2$ and $C_3$ receive the same signal from an upstream component CO, then a single definite breakdown would be detected by a testing means $T_1$ if it takes place in CO and such a breakdown would be detected by the testing means $T_2$ if it takes place in $C_1$, $C_2$, or $C_3$. $T_1$ and $T_2$ are generally decoders associated with such codes as parity k out of n, Berger or Hamming codes.

To recognize the significance of the invention, assume that there is an ambiguous breakdown in component CO. This breakdown will produce a weakened signal which can be interpreted as a correct signal by $T_1$ while concurrently causing two erroneous interpretations by two of the three components $C_1$, $C_2$, $C_3$. Thus, two of the inputs to $T_2$ will be simultaneously incorrect as if two of the three components $C_1$, $C_2$, $C_3$ were simultaneously in a definite breakdown state, and such a "multiple breakdown" might not be detected by $T_2$. The ambiguous breakdown in CO thus leads to an error situation which is detected by neither $T_1$ nor $T_2$.

The basic principle of the present invention is to be sure that an ambiguous signal cannot simultaneously enter into several components which are being monitored by conventional means of testing for a single definite breakdown.

Figure 2:
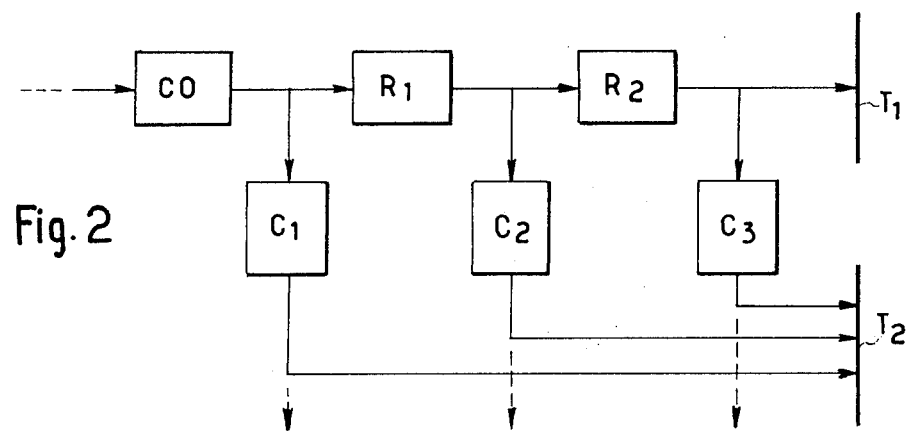
FIG. 2 is a schematic circuit diagram, in block form, of a circuit arrangement of a security processor in accordance with the invention.

A technique for doing so is illustrated in FIG. 2 wherein a rectification circuit or signal correction or interpreting circuit $R_1$ is inserted in the security processor circuit in order to restore a possibly weakened output signal from CO into a definite form. Thus, $C_1$ will receive the output of upstream circuit CO in whatever form it exists, while $C_2$ and $C_3$ will receive a well-formed signal, either correct or incorrect, but certainly unambiguous. Furthermore, since the circuit $R_1$ is itself susceptible to an ambiguous breakdown, a second correction circuit $R_2$ is connected in series with $R_1$ to restore the output of signal $R_1$ to a definite form.

Under these conditions, only one of the components $C_1$, $C_2$, $C_3$ can receive a weakened signal in the event of a single breakdown of any of CO, $R_1$ or $R_2$.

In a practical embodiment of the apparatus, circuits $R_1$ and $R_2$ can constitute Schmitt triggers, whether or not inverted, or these circuits can be constructed using logic gates.

The following is a consideration of the possible alternative circumstances.

(a) CO is in either a definite or an ambiguous breakdown state and gives information the interpretation of which by $R_1$ is incorrect. Thus, the output of $R_1$ is incorrect as is that of $R_2$, and this error is detected by $T_1$.

(b) CO is in an ambiguous breakdown state and sends information which is correctly interpreted by $R_1$ and which is incorrectly interpreted by $C_1$. The output from $R_1$ is correct and are the outputs from $R_2$, $C_2$ and $C_3$. Thus, $T_2$ detects the error in the output from $C_1$.

(c) $R_1$ is in a definite or an ambiguous breakdown state and sends information which is incorrectly interpreted by $R_2$. The $R_2$ output is therefore incorrect and this fact is detected by $T_1$.

(d) $R_1$ is in an ambiguous breakdown state and sends information which is correctly interpreted by $R_2$ but incorrectly interpreted by $C_2$. The $R_2$ output is correct, as are the $C_1$ and $C_3$ outputs. Thus, $T_2$ detects the error in the $C_2$ output.

(e) $R_2$ is in either a definite or an ambiguous breakdown state. The $C_1$ and $C_2$ outputs are correct. $T_2$ thus detects any possible error in the $C_3$ output.

To summarize, it can be seen that if the test means $T_1$ receives a correct signal then a maximum of one of the components $C_1$, $C_2$, $C_3$ is incorrectly interpreting the signal and sends or will send an error to the test means $T_2$, and this error will be detected in the same way as any error caused by a single breakdown in $C_1$, $C_2$ or $C_3$.

In general, any number of downstream components in parallel circuit relationship receiving the same signal from an upstream component which is susceptible to an ambiguous breakdown can be isolated from each other by intermediate serially connected signal correction circuits with a test device at the output of the last rectifier ensuring that only one of the downstream components could have received a weakened signal.

Figure 3:
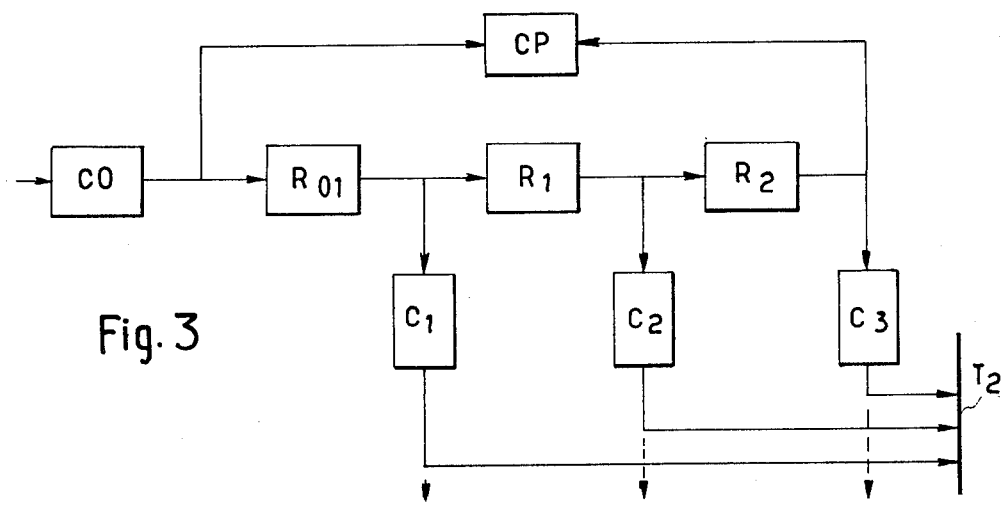
FIG. 3 is a schematic circuit diagram, in block form, of a further embodiment of a device in accordance with the invention using a comparator.

FIG. 3 shows a variation of the implementation of the invention in such cases in which, according to the current technique, the tests of the component CO would not be made directly at its output. The test means $T_1$ is, in this situation, replaced by a comparator CP which performs a comparison between the output of the last rectifier and the output of components CO, the rectifier $R_{01}$ being connected to isolate the output of circuit CO and the input of the comparator from the component $C_1$. The comparator CP can be any known type but it should, of course, have specific security.

Figure 4:
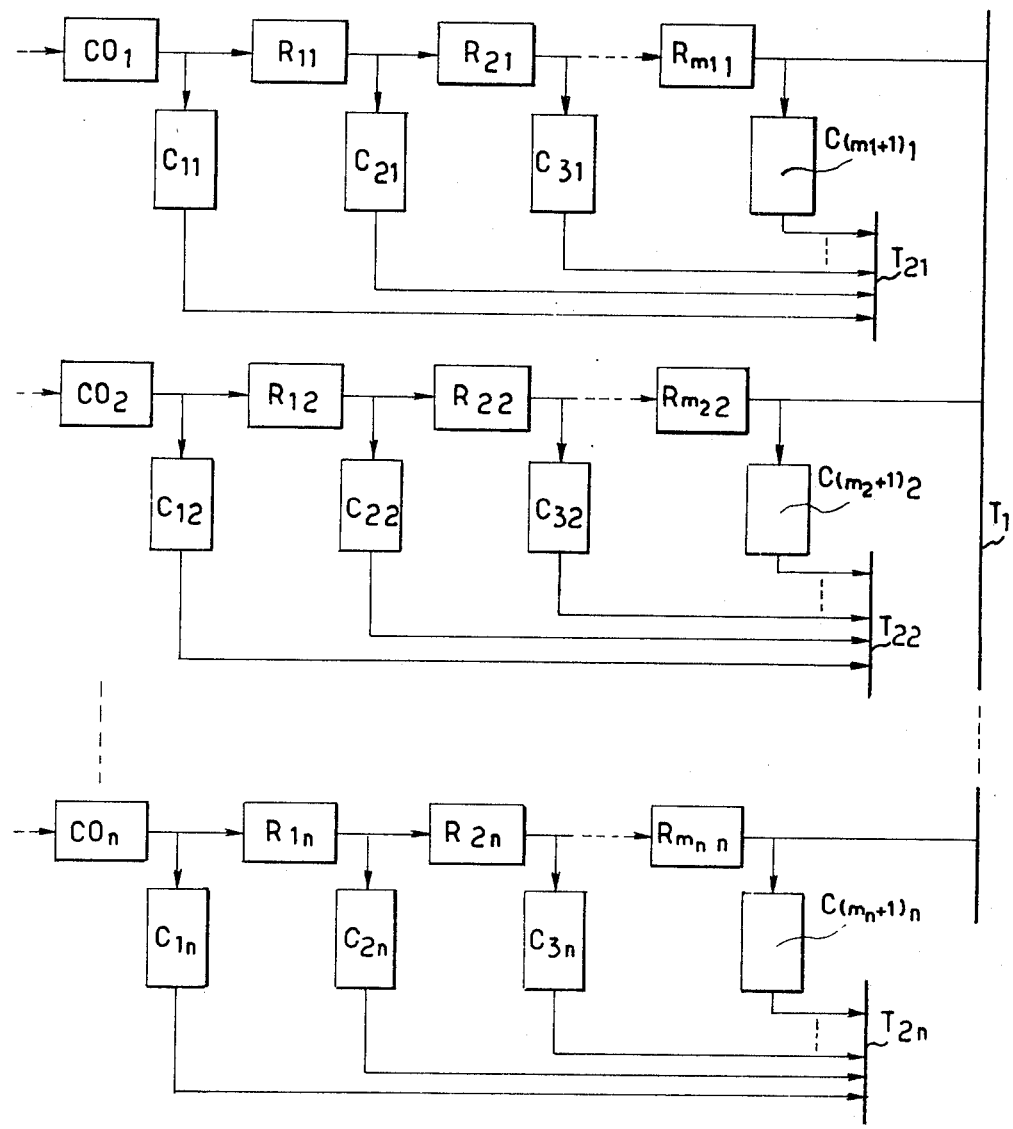
FIG. 4 is a schematic block diagram of a still further embodiment of an apparatus in accordance with the invention.

FIG. 4 shows another variation of an apparatus in accordance with the invention in which several upstream components $CO_1$, $CO_2$ ... $CO_n$ are grouped in parallel form. The test $T_1$ is then carried out on a self-detection code between the end outputs of this series of parallel components, the principle employed in each of the parallel chains 1 to n being the same as that discussed in connection with FIG. 2.

Figure 5:
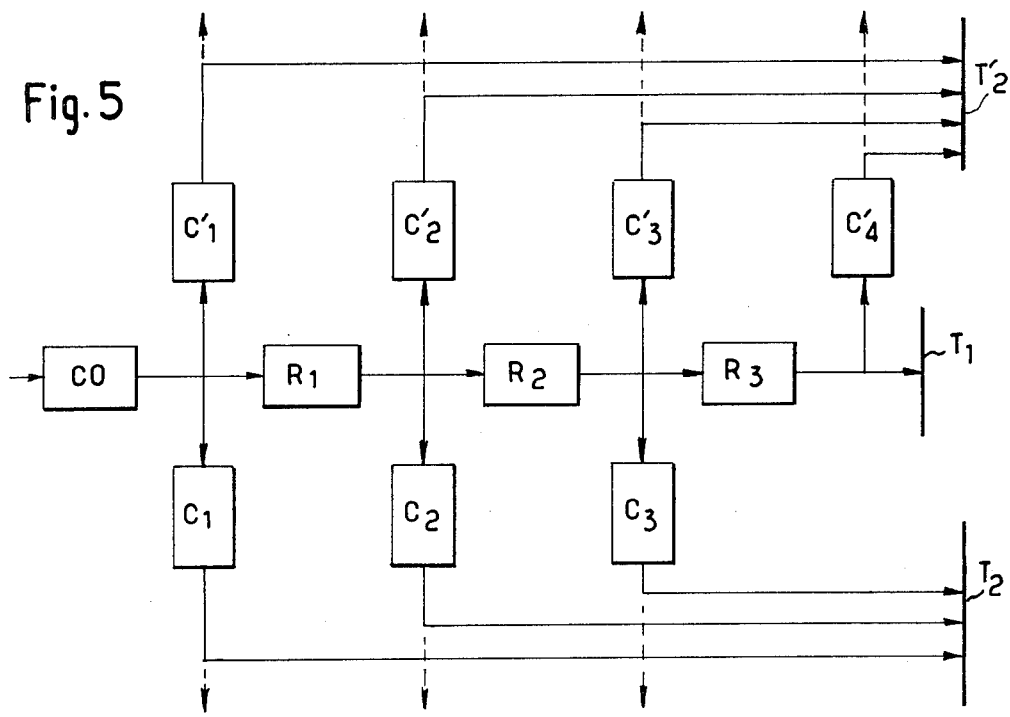
FIG. 5 is a schematic block diagram of yet another embodiment of the invention using a plurality of testing devices.

FIG. 5 shows a further embodiment of an apparatus in accordance with the invention in which several independent testing means such as $T_2$, $T'_2$ are used to test unconnected groups of downstream components. In this situation, it is not necessary to separate individual ones of the downstream components with signal correction circuits. Indeed, at each node between two rectifiers, the signal can be distributed to as many downstream components as there are independent test means.

Figure 6:
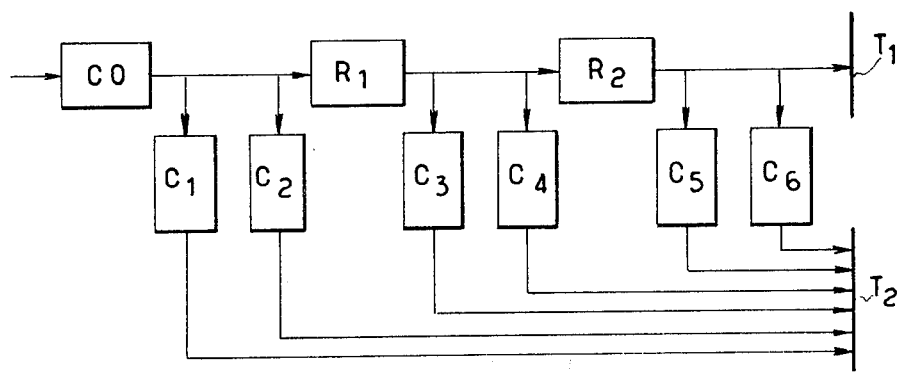
FIG. 6 is a schematic block diagram of an embodiment of the invention permitting double breakdown detection.

In the situation where the test means $T_2$ allows the detection of double breakdowns on downstream components, it also possible, as illustrated in FIG. 6, to group these components in pairs. Then, there is only one signal correction circuit for each two downstream components.

It is furthermore evident that the invention is not limited to the different modes of implementation shown and described herein and that a number of modifications can be made without departing from the spirit or scope of the present invention. Particularly, the invention is not specific to a particular method or means for coding or decoding and testing.

We claim:

1. An apparatus for the prevention of the propagation of errors in a security processor of the type having processing circuits for performing arithmetic and logic operations on given operands and means for detecting single definite breakdown errors occurring as the result of breakdowns in the processing circuits, these processing circuits including a single upstream processing circuit that produces signals which are distributed in parallel to a plurality of downstream processing circuits, the combination comprising:

a plurality of signal interpreting circuit means, each for receiving an ambiguous, weakened signal and producing a signal having a definite, unambiguous output; and circuit means for interconnecting said plurality of signal interpreting circuit means in series relationship with each other, and with the upstream processing circuit, with the input to at least one of said downstream processing circuits being connected between two successive signal interpreting circuit means;

said means for detecting being connected to said downstream processing circuits to detect a single definite breakdown in said downstream processing circuits and to the last of the series of signal interpreting circuit means to detect a single definite breakdown from any of said signal interpreting circuit means of the series.

2. An apparatus according to claim 1 wherein said means for detecting a single definite breakdown from any of said signal interpreting circuit means of the series includes a comparator having one input connected to receive the output of said upstream processing circuit and the input to the first of said signal interpreting circuit means and the other input connected to receive the output of the last of said signal interpreting circuit means of the series.

3. An apparatus according to claim 1 wherein the processor includes a plurality of upstream processing circuits, each delivering signals to a plurality of downstream processing circuits, each having a plurality of signal interpreting circuit means, wherein a self-detection code means is responsive to the outputs of the ends of the series of these parallel processing circuits and the output of the last signal interpreting circuit means of each series to detect a single definite breakdown, and wherein the means for detecting is coupled to the output of the last signal interpreting circuit means of each series as a test of the self-detection code means on the whole of these outputs of the ends of the series.

4. An apparatus according to claim 1 wherein the output of some of said signal interpreting circuit means is connected to the inputs of a plurality of said downstream processing circuits, the outputs of the downstream processing circuits, which use the same signal interpreting circuit means output, being tested independently of each other by a pair of separate means for detecting single definite breakdown errors.

5. An apparatus according to claim 1 wherein said downstream processing circuits are grouped in batches, the processing circuits of some of the batches being connected to the output of one of said signal interpreting circuit means, whereby said means for detecting can detect any combination of breakdowns of the processing circuits of such batches so connected.

6. In a security processor including an upstream processing circuit for performing arithmetic and logic operations, at least three downstream processing circuits for performing arithmetic and logic operations and connected in parallel with the upstream processing circuit, and means for detecting single definite breakdown errors in the upstream and downstream processing circuits, a method of preventing ambiguous signals from simultaneously entering the downstream processing circuits comprising the steps of receiving the signal from the upstream processing circuit, which signal is also the input signal to the first of the downstream processing circuits, and producing a second signal having a definite, unambiguous output, receiving the second signal, which signal is also the input signal to the second of the downstream processing circuits, and producing a third signal having a definite, unambiguous output, transmitting the third signal to the means for detecting single definite breakdown errors and to the third of the downstream processing circuits, and transmitting the outputs of the downstream processing circuits to the means for detecting single definite breakdown errors.

7. In a security processor including an upstream processing circuit for performing arithmetic and logic operations, at least two downstream processing circuits for performing arithmetic and logic operations and connected in parallel with the upstream processing circuit, and means for detecting single definite breakdown errors in the upstream and downstream processing circuits, a method of preventing ambiguous signals from simultaneously entering the downstream processing circuits comprising the steps of receiving the signal from the upstream processing circuit, which signal is also the input signal to the first of the downstream processing circuits, and producing a second signal having a definite, unambiguous output, transmitting the second signal, which signal is also the input signal to the second of the downstream processing circuits, to the means for detecting single definite breakdown errors, and transmitting the outputs of the downstream processing circuits to the means for detecting single definite breakdown errors.

* * * * *